March 30, 1965 R. L. McDOWELL 3,175,339
CONJUGATED CELLULOSIC FILAMENTS
Filed Oct. 30, 1959 2 Sheets-Sheet 1

3,175,339
CONJUGATED CELLULOSIC FILAMENTS
Robert L. McDowell, Springfield, Pa., assignor, by mesne assignments, to FMC Corporation, San Jose, Calif., a corporation of Delaware
Filed Oct. 30, 1959, Ser. No. 851,932
27 Claims. (Cl. 55—74)

This application is a continuation-in-part of my application entitled Conjugated Cellulosic Filaments, Serial No. 602,964, filed August 9, 1956, now abandoned.

The present invention is directed to particle-loaded pellicles such as synthetic films, filaments and the like and to a method for their production. More specifically, the invention is directed to a particle-loaded monofilament or "monofil" comprised of a heavily-loaded section integrally joined to a particle-free or substantially particle-free section.

The particles consist of an active contact agent such as absorbents, adsorbents, catalysts, ion-exchange resins and other solids as commonly used for these various purposes in liquid and gas phase reactions. These contact agents are commonly employed in granular form or may be carried by inert granular material. The substance is usually in the form of a layer or bed in a column of the closely packed granules and where the bed is of any appreciable thickness, a considerable pressure drop occurs in passing of the fluid reactants through such a bed. Where a high rate of fluid flow through the column is maintained, it is common for the fluid to channel through certain portions so that other portions of the contact agent in the bed or column are not utilized effectively.

Perhaps the most widely used contact agent and the best known is activated carbon and the invention will be described more specifically by reference to this substance. However, any of the solid contact agents may be employed as will be described hereinafter.

The use of activated carbon as an adsorbent and decolorizer is well known. In some applications, it is desirable that the carbon be in the form of threads or filaments from which loose, felt-like bodies or batts may be produced in order to permit circulation of fluid around the carbon and maximum contact between the fluid and the carbon, and to permit more convenient installation of the adsorbent into apparatus than would be possible with free-flowing granules. It is obvious that in the passage of fluids through loose felt-like bodies or batts, channeling of the fluid is avoided and there is a more effective and uniform utilization of the activated carbon than is possible when closely packed granules are used. Attempts have been made in the past to inject activated carbon into viscose and to spin the resulting pigmented viscose by conventional methods into a coagulating bath to form regenerated cellulose filaments pigmented with carbon. This method is satisfactory for coloring filaments but unfortunately at the high concentration or loading of carbon which is required to expose a carbon surface in the filament to the atmosphere or other fluid, the filament is very weak and brittle and the gas adsorption rate is only about 50% of that of the original raw carbon. If the carbon content of the viscose is reduced to a point where it will not interfere with the strength of the filament, the resulting filament contains an insufficient amount of available carbon to be of any value for adsorbent or decolorizing purposes. Similarly, other contact agents might be utilized to color filaments but when sufficient amounts of the agent are incorporated in the filament so as to form an effective contact material, the filaments are so weak and brittle that they can not be handled. The present invention provides a method for producing a heavily-loaded particle-containing filament having sufficient strength to resist the breakage encountered in many uses, yet the process can be performed in conventional spinning equipment.

Accordingly, it is an object of the present invention to prepare a strong and flexible pellicle containing up to 95% or more activated carbon or other contact agent based on the weight of the pellicle. A further object is to provide a method of manufacturing particle-loaded pellicles. Another object of the invention is to provide a particle-loaded monofilament containing a high proportion of the free particles and having an activity substantially equal to that of the particles per se. A specific object is the preparation of a carbon-loaded monofilament containing a high percentage of available activated carbon and having a gas adsorption rate and adsorption activity substantially equal to that of the raw carbon.

In accordance with the present invention, it has been found possible to extrude two spinning solutions through spinnerets of the type necessary to produce a conjugated filament, one component of which contains a substantial amount of the contact agent such as activated carbon while the other component is substantially or entirely free of the contact agent, the two components being joined side-by-side along the length of the filament. The two components can be spun into any of the known types of coagulation atmospheres or regenerating baths to set up the filament. The surprising development in this is the discovery that the conjugate monofil, when loaded with a contact agent such as activated carbon to the same extent as a regular injection-spun carbon-loaded monofil has twice the gas-adsorption rate of the latter. In the preferred embodiment of the present invention, a stream of viscose containing a major amount of dispersed contact agent such as active carbon is conjugate-spun with a second stream of conventional unpigmented viscose into an acidic coagulating bath to form at least two regenerated cellulose filaments in contacting relationship or as two contacting concentric rings, one of the filaments being heavily loaded with the contact agent such as activated carbon and therefore inflexible and brittle, while the other filament consists of ordinary regenerated cellulose of average strength and flexibility.

In the drawings, illustrative of the invention

Figure 1:
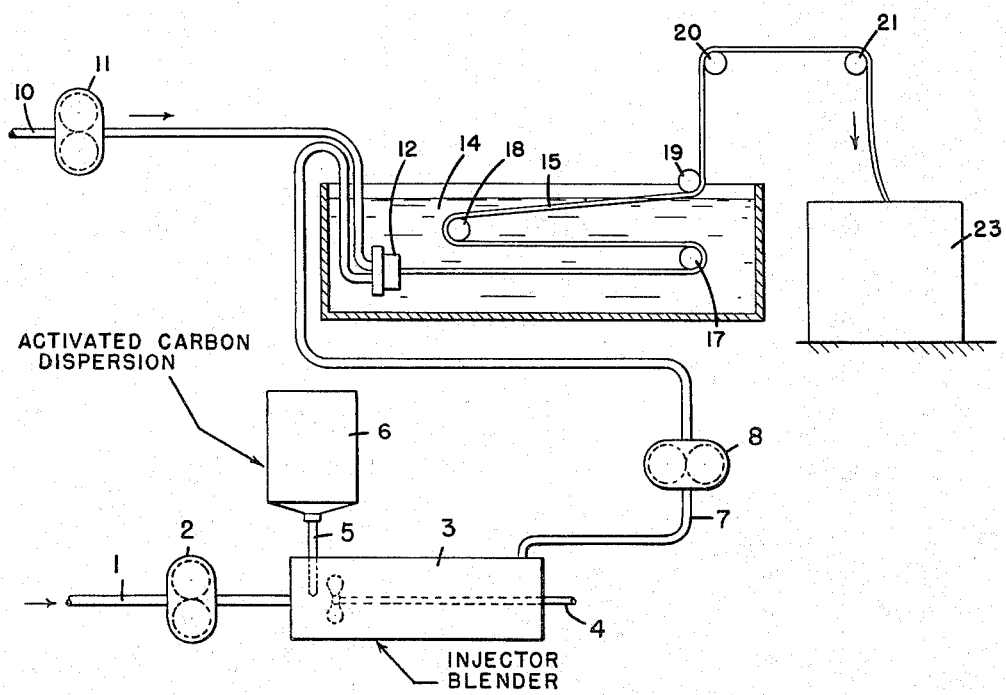
FIGURE 1 is a diagrammatic view of the spinning apparatus used in the process of this invention.

Referring to FIGURE 1, a spinnable viscose solution is metered through line 10 by pump 11 and advanced directly to a spinneret 12 immersed in a conventional spinning bath 14. At the same time, the pump 2 meters a stream of viscose at the same rate through line 1 into injection blender 3 wherein it is thoroughly mixed by stirrer 4 with an aqueous dispersion of the finely divided contact agent such as carbon admitted through line 5 from dispenser 6. This dispersion may comprise 25% to 30% by weight or more of the contact agent such as an active adsorptive fine-mesh carbon, based on total weight of the dispersion, and a small amount of a dispersant. From the blender 3, the particle-loaded viscose is now advanced through line 7 by a third pump 8 into spinneret 12, wherein it is extruded together with the viscose from line 10 as a single stream into spin bath 14. Here, it is coagulated into a single conjugated two-component filament 15, the structure of which depends on the design of spinneret 12, as described subsequently. In order to effect complete regeneration of the cellulose, the filament 15 passes over a plurality of guides 17, 18 immersed in spin bath 14 and is then withdrawn from the bath at guide 19 and drawn over godets 20, 21, with or without an intermediate stretch. From godet 21, it falls into collection box 23, which preferably may contain a dilute acid. When removed from box 23, it is washed free of acid and then dried. Obviously, other common methods for treating the filaments after they leave the spinning bath may be used. For example, the filaments may be passed over thread-advancing reels or drums and the filaments subjected to streams of suitable liquids such as an acid solution, wash water, sodium bicarbonate solution to neutralize the acid carried over, further wash water and finally drying. The final monofil preferably contains 80% to 90% carbon by weight based on the dry filament weight or 400% to 900% by weight of the total cellulose in the conjugate yarn, equal to over 800% to 1800% active carbon by weight based on the cellulose in the carbon-containing portion of the monofil.

Figure 2:
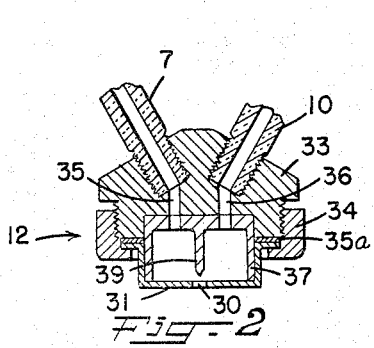
FIGURE 2 illustrates a spinneret designed to produce a conjugated side-by-side filament.

Referring to FIGURE 2, a spinneret 12 has a hole 30 in the center of jet 31, which is attached to a spinning solution supply head 33 by the coupling 34. A gasket 35a is positioned between the flange of the jet 31 and the supply head 33 to insure a tight seal. Metered amounts of two different spinning solutions are delivered as shown in FIGURE 1 to the supply head 33 by the pipes 7 and 10 which communicate with the passages 35 and 36, which in turn empty into a cup-like member 37 positioned in the space between the jet 31 and the supply head 33 with its cylindrical side wall in engagement with the side wall of the jet and with its base in engagement with the supply head 33. A rib-like divider 39 projects from the base of the cup-like member 37 and in a general way bisects the entrance of the orifice 30, thus dividing the space within the cup 37 into two separate zones, one connecting to inlet line 10 and the other to inlet line 7.

Figure 3:
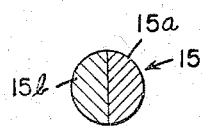
FIGURE 3 shows a cross-section of such a filament.

In the operation of this embodiment of the invention the plain viscose delivered by line 10 through passage 36 to the left hand side of cup 37 emerges through orifice 30 side-by-side with the particle-loaded viscose delivered through line 7 and bore 35. The two viscoses are thus coagulated into a "Siamese twin" type of monofilament, one side being conventional regenerated cellulose, the other side being a particle-containing regenerated cellulose. The resulting filament is illustrated in cross-section in FIGURE 3, showing a filament 15 divided into a particle-loaded portion 15b and a plain or particle-free portion 15a.

Figure 4:
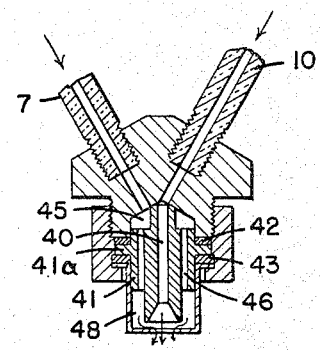
FIGURE 4 shows a spinneret designed to produce a ring-core type of filament.
Figure 5:
FIGURE 5 shows a cross-section of such a filament.

FIGURE 4 shows a modification of the embodiment of FIGURE 2 wherein corresponding parts are numbered as in FIGURE 2. FIGURE 4 differs in that line 10 (plain viscose) opens into a central bore 40 in a feeder 41 having a flanged rim 41a secured by washers 42, 43 and tightened against supply head 33 by coupling 34. Line 7 (particle-loaded viscose) opens into an annular header 45 which discharges into a circle of outer bores 46, two of which are illustrated in FIGURE 4, although several more may be present. In a small jet, say one-half inch diameter, a limit of four or five of these outer bores 46 is preferred because as their number is increased their diameter must be reduced, leading to the point where they tend to become plugged by the particles in the paritcle-loaded viscose. Bores 46 open at their lower ends into a cup-shaped space 48 annularly surrounding the lower end of feeder 41. The plain viscose stream flowing through line 10 is extruded through the center of orifice 30 while the particle-loaded viscose is extruded around the periphery, as indicated by the arrows. The resulting stream is coagulated in the spin bath as a ring-core type monofil, a cross-section of which is shown in FIGURE 5. The plain or particle-free regenerated cellulose 15a is in the center of the filament 15 while the annular portion 15b is particle-loaded.

EXAMPLE I

A viscose solution of a composition of 8.0% cellulose, 7.0% sodium hydroxide and 36% carbon disulfide based on cellulose was metered at the rate of 5.3 gms./min. to a spinneret. Simultaneously, a second stream of the same viscose was pumped at the same rate into an injection blender wherein it was thoroughly mixed with an active carbon dispersion admitted through a dispenser at the rate of 11.3 cc./min. This dispersion was composed of 30% active carbon (granular gas adsorption type), 0.24% of a polyacrylamide dispersant, the remainder water. From the injector, the carbon-containing viscose was pumped to the spinneret and there extruded side-by-side with the plain viscose stream through a single orifice into an acidic spinning bath containing 5.2% sulfuric acid and 20.5% sodium sulfate (percent is by weight of the solution) in water. After a 100 inch immersion, the coagulated monofil was withdrawn from the bath and passed in series over a first godet and a second godet without stretching, at a speed of 30 m./m. (meters per minute). From the second godet, the monofil was collected in a spinning bath solution from which it was eventually removed to be water-rinsed, boiled, rinsed again, and then dried. The final monofil contained 82.4% carbon by weight of the monofil or about 468% based on the total cellulose in the conjugate yarn, equal to about 953% active carbon by weight based on the cellulose in the carbon-loaded half of the monofil.

EXAMPLE II

The general procedure of Example I was repeated except that the spin bath composition was 9.3% $H_2SO_4$—1.4% $ZnSO_4$—18.4% $Na_2SO_4$, and the monofil was stretched 11.8% between the godets.

EXAMPLE III

A viscose solution of a composition of 8.0% cellulose, 7.0% sodium hydroxide and 36% carbon disulfide based on cellulose was metered at the rate of 5.4 gms./min. to a spinneret. Simultaneously, a second stream of the same viscose was pumped at the same rate into an injection blender wherein it was thoroughly mixed with an active carbon dispersion admitted through a dispenser at the rate of 16.1 cc./min. This dispersion was composed of 20% active carbon (150 mesh granular gas adsorption type), 0.21% Aerofloc dispersant (hydrolyzed polyacrylonitrile), the remainder water. From the injector, the carbon-loaded viscose was pumped to the spinneret and there extruded with the plain viscose stream, the latter discharging through the center of the jet orifice, the carbon-loaded stream discharging around the periphery of the orifice, into an acidic spinning bath which had a composition of 8.8% $H_2SO_4$, 1.3% $ZnSO_4$, and 16.1% $Na_2SO_4$. The composite stream coagulated in the bath to form a ring-core type of monofilament with the carbon-free regenerated cellulose at the center and the carbon-containing regenerated cellulose at the surface, such as illustrated in FIGURE 5. After a 90 inch immersion, the coagulated monofil was withdrawn from the bath and passed in series over a first godet and a second godet without stretching at a speed of 15 m./m. From the second godet, the monofil was collected in a spinning bath solution from which it was eventually removed to be water-rinsed, boiled, and then dried. The final monofil contained 82.1% carbon by weight of the monofil or about 459% by weight based on the total cellulose in the conjugate yarn, equal to about 931% active carbon by weight based on the cellulose in the carbon-containing sheath of the monofil.

EXAMPLE IV

In order to compare the adsorbent power of the conjugate monofil of this invention with that of a monofil prepared from a conventional pigmented viscose, two carbon-loaded filaments were spun using the process of this invention. One was a "Siamese twin" type, or side-by-side conjugation, prepared using the spinneret of FIGURE 2; the other was a ring-core type prepared by spinning through the jet of FIGURE 4. Two other filaments were spun by conventional injection spinning, the carbon being dispersed throughout the spinning solution prior to extrusion. All four filaments were then compared for $CCl_4$ break-through time by a procedure which consisted in passing through a bed of each type filament a stream of $CCl_4$ gas having an influent concentration ($C_o$) of 285 mg./liter at a flow rate of 800 cc./min. of air. The concentration of the effluent gas was continuously checked to determine the 10% $C_o$ and 50% $C_o$ break-times in seconds, i.e., the time required for the effluent gas to attain a $CCl_4$ concentration of 10% and 50% of the concentration of the influent, or in this case a $CCl_4$ concentration of 28.5 mg./liter and 142.5 mg./liter. The 50% point is arbitrarily considered as the end of the effective life of the sample. Results are shown in the table below, wherein Samples A and B are the conventional pigment-spun filaments and C and D are the filaments of this invention.

*Table I*

| | Particle Size (carbon) | Weight Percent Carbon in Monofil | Break-time, Sec. | |
|---|---|---|---|---|
| | | | 10% $C_o$ | 50% $C_o$ |
| A | 150 mesh | 82.9 | 111 | 327 |
| B | 150 mesh | 83.3 | 152 | 366 |
| C Siamese | 150 mesh | 82.4 | 358 | 432 |
| D Ring-core | 150 mesh | 84.3 | 375 | 468 |

It is evident that the adsorbent power and effective life of the conjugate filaments is far above that of the conventional pigmented filaments, even though the carbon content of the two groups is substantially the same.

EXAMPLE V

Figure 6:
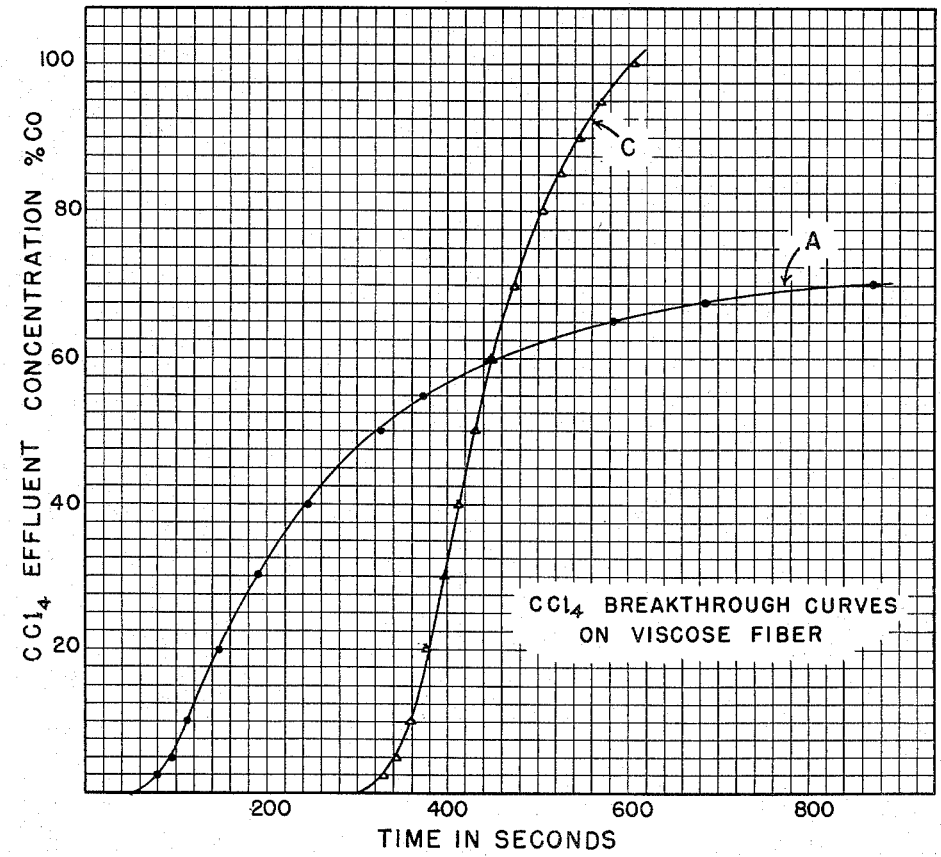
FIGURE 6 is a graph comparing the adsorptive life of two activated carbon-containing filaments.

Samples A and C from the above table were compared for $CCl_4$ break-time for an extended period, using the procedure of Example IV. The results are plotted on FIGURE 6. It is evident that Sample C, the conjugate type, absorbs $CCl_4$ for a much longer time than the A sample and then deteriorates rapidly whereas the A sample begins to fail in less than one minute but then deteriorates at a lower rate than C. Since the desirable quality here is maximum adsorption prior to initial break-through, not after, the superiority of the conjugate filament is obvious. Note, for example, that the A sample begins to leak gas at about one minute but the C sample does not begin to leak gas for 300 seconds. Turning next to the premise laid down in Example IV that when the effluent concentration is 50% of the influent concentration the effective life of the sample is ended, FIGURE 6 demonstrates in graph form what Table I shows in figures. That is, FIGURE 6 shows the 50% point is reached for the A sample at 327 seconds whereas the 50% point for the C sample is reached at 432 seconds.

Examples IV and V point up a most surprising development, since there is no obvious reason to expect that the carbon in a conjugated monofilament will have a greater activity and a much higher gas adsorption rate than an equal weight of the same carbon in a conventional homogeneously-pigmented filament. The explanation may be that the carbon particles are closer together in the conjugate monofil than in the regular monofil and, hence, there is less of a film of cellulose through which the gas must diffuse before contacting the active carbon. The discovery that it is possible to shape a granular amorphous carbon into a form wherein it is non-dusting and clean, and can be packed loosely, yet with little or no sacrifice in its activity, is believed to be the crux of the present invention.

It has been found that the activity of the carbon in terms of adsorption rate declines sharply when the carbon concentration in the monofilament falls below 75% by weight, hence, the carbon concentration should be maintained at 75% by weight or more. There is nothing critical as to the viscose composition or the spinning bath composition; any conventional spinnable viscose can be employed as well as any acidic cellulose regenerating bath. The stretch usually applied to cellulose yarn to increase its tensile strength can be employed here or can be dispensed with since in either case the dimensional strength of the carbon-loaded strand is quite limited in comparison with that of the rayon strand.

Any method of collection of the freshly spun monofilament can be used so long as it does not involve undue mechanical working of the monofil which would cause considerable breakage of the carbon-containing portion thereof.

Although the foregoing illustration specifically refers to activated carbon, other active or catalytic materials may be used in place of the carbon, the materials being those commonly used in absorbent or adsorbent columns, extraction columns, chromatography, those used as catalytic substances for liquid or gas phase reactions, etc. The materials must be finely-divided for mixing with the spinning solution and include metal oxides, such as alumina, magnesia, chromic oxide and the like, clays, metals, etc. The substances must be inert, i.e., they should not swell when added to the particular filament-forming or spinning solution or liquid or during any processing required in forming the particular pellicles. Similarly, the substances must not react with any of the constituents of the spinning liquid or with any possible fluids with which the pellicles are processed before completion.

The invention is, however, not limited to the use of substances which are completely inert to the spinning liquid. For example, ion-exchange resins are available for a wide variety of uses. As is known, the cation-exchange resins are, in general, dependent upon their capacity of exchanging ions upon acidic groups, such as carboxylic acid, sulfonic acid, phosphonic or phenolsulfonic acid groups. The anion-exchange resins contain basic groups and, in general, are of a polyamine or quaternary ammonium form. These substances are commonly in a spheroidal form and are packed in beds or columns. Commercially, these substances are marketed under numerous trade names or trademarks such as Amberlite (Rohm & Haas Company), Dowex (Dow Chemical Company), Duolite (Chemical Process Company) and Permutit (Permutit Company). These substances in finely-divided form may be utilized in the same manner as activated carbon as described hereinbefore. In the use of the cation-type ion-exchange resins, they are converted into a sodium form before being incorporated into the viscose solution for example. In the case of the anion-types of ion-exchange resins, they are first converted into a hydroxyl form before introducing them into the viscose. These substances swell in the viscose and, in general, it has been found that lower proportions by weight may be employed without a loss of effectiveness of the resin. Whereas it has been found that the totally inert materials such as carbon which are unaffected by the spinning solution should be maintained at at least about 75% by weight of the filament, those substances which swell in the spinning solution such as the ion-exchange resins in viscose when present in amounts of as low as 40% by weight of the pellicle will retain their activity.

EXAMPLE VI

A viscose solution having a composition of 7.5% cellulose, 6.0% sodium hydroxide and 36% carbon disulfide, based on the weight of the cellulose, was metered to supply about 0.375 gram of cellulose per minute to one side of a spinneret as illustrated in FIGURE 2. To the other side of the spinneret, there was metered the same viscose solution containing a synthetic strong cation-exchange resin to deliver to the spinneret about 0.375 gram of cellulose and about 0.75 gram of the ion-exchange resin. The specific cation-exchange resin derives its activity from carboxylic acid groups and is marketed as Amberlite IRC–50 by Rohm & Haas Company. This sample was of a powder form, 95% passing through a 325 mesh screen. The resin was converted from the acid form to the sodium salt and was dispersed in a sodium hydroxide solution containing a medium viscosity grade of carboxymethyl cellulose (Type 70 as marketed by Hercules Powder Company). The resin dispersion contained about 15.8% resin, 0.8% carboxymethyl cellulose and 4.8% caustic soda. The carboxymethyl cellulose is used as a dispersing agent and a thickening agent to maintain the resin in suspension and to aid in mixing the dispersion with the viscous viscose solution. The dispersion and viscose were mixed in a blender in a manner as shown in FIGURE 1. The two contacting and parallel streams of viscose were spun into a spinning bath containing 10% sulfuric acid and 17.5% sodium sulfate. The spun filament was processed by removing from the spinning bath, washing and drying. Although an attempt was made to form a filament containing about 50% resin by weight of the filament, the product actually had 60% resin based on the weight of the filament. The cation-exchange capacity of the resin and of the filament containing resin were determined by a standard method as described in volume 27, Analytical Chemistry, pages 1191–1194 (1955). The results are set forth in the table which follows the examples.

EXAMPLE VII

In a similar manner, a "Siamese twin" type filament was formed containing a weak cation-exchange resin. This resin was a nuclear sulfonic acid type resin marketed as Amberlite IR–120 by Rohm & Haas Company. The resin suspension in this example contained about 20% of the finely-divided resin, 0.5% guar gum as a dispersant and thickening agent with the balance being water. The filaments consisted of approximately 40% resin based on the weight of the filaments. The exchange capacities of the resin and of the filaments containing resin were determined as in Example VI and the results are set forth in the table which follows the examples.

EXAMPLE VIII

Filaments were formed as described in Example VI incorporating in one stream of viscose a weak base phenol-formaldehyde-type anion-exchange resin marketed as Amberlite IR–4N by Rohm & Haas Company. The resin was introduced into the viscose in the form of a dispersion containing about 20% of the resin, 0.5% guar gum with the balance water. The filaments contained approximately 77% of the anion-exchange resin based on the weight of the filaments.

EXAMPLE IX

Filaments were prepared by the method as described in Example VI containing a strongly basic anion-exchange resin of the quaternary amine type such as that marketed as Amberlite IRA–410 by Rohm & Haas Company. The filaments contained approximately 45% resin based on the weight of the filaments.

In the table which follows, the exchange capacity of the resins per se are set forth in milliequivalents per gram of resin and for the filaments containing the resin, the capacity is set forth as milliequivalents per gram of dry filaments. Figures in parentheses following the capacity figures for the filaments represent the capacity of the filaments per gram of exchange resin.

Table II

| Sample | Percent Resin | CEC | SBC | AEC | SSCC |
|---|---|---|---|---|---|
| A | 100 | 10.2 | | | |
| CA | 60 | 6.4(10.7) | | | 5.0 |
| B | 100 | 5.1 | | | |
| CB | 40 | 2.5(6.2) | | | 1.9(4.8) |
| C | 100 | | | 8.0 | |
| CC | 77 | | | 7.0(9.1) | |
| D | 100 | | 2.5 | 4.3 | |
| CD | 45 | | 0.48(1.1) | 2.2(4.9) | |

The letters A, B, C and D represent the ion-exchange resins of Examples VI, VII, VIII and IX respectively.
The designations CA, CB, CC and CD represent the filaments of Examples VI, VII, VIII and IX respectively.
CEC—cation-exchange capacity.
SBC—strong base capacity.
AEC—anion-exchange capacity.
SSCC—salt splitting cation capacity.

The data illustrates that with the exception of the strong base capacity, there is no loss in the capacity of the resins. In certain instances, a slight increase in capacity is noticeable which is probably accounted for by the exchange capacity of the regenerated cellulose.

While the invention has been illustrated using viscose as the spinning solution, it should be pointed out that other filament-forming materials are also operative. These include thermoplastics such as cellulose esters of the type of cellulose acetate and propionate, mixed cellulose esters such as cellulose aceto-propionate and aceto-butyrate, organic-solvent soluble, alkali-soluble and water-soluble types of cellulose ethers such as methyl, ethyl, benzyl cellulose, hydroxyethyl cellulose, carboxymethyl cellulose, etc., mixed cellulose ethers, mixed cellulose ester-ethers, for example, methyl or ethyl cellulose acetate, vinyl resins such as acrylic and methacrylic resins, vinyl ester polymers such as vinyl acetate, vinyl ether polymers such as vinyl acetals, vinylidene halides such as vinylidene chloride, polyethylene and polypropylene, nylons such as polyhexamethyleneadipamide, polyesters such as polyethylene terephthalate, copolymers of vinyl esters and vinyl halides, notably vinyl acetate-vinyl chloride, polyacrylonitrile, Saran, etc. The spinning process must, of course, be adapted to the spinning solution; for example, cellulose acetate would be dry-spun into gaseous acetone and nylon would be melt-spun.

It should also be emphasized that the two spinnerets illustrated in FIGURES 2 and 4 are simply illustrative of the type that may be used in preparing the conjugated monofilament of this invention. If one desired a multi-strand monofilament, it would be within the skill of the art to employ certain of the spinnerets illustrated in United States Patent 2,386,173. If a fine line of separation between the two viscoses is not necessary, one may employ a simple T-fitting behind an extrusion orifice, so that one viscose can be added at the side and the other viscose through the side arm of the T. In this way, the two streams will flow side-by-side for some distance without mixing. A tri-sected spinneret may be used in which the plain solution is extruded through the center and the particle-loaded solution on each side. In the case of viscose, one may form a ring-core type of filament somewhat like that of FIGURE 5 but employing the spinneret of FIGURE 2 through suitable selection of viscoses. This is accomplished by using a young viscose (high salt test) as the plain component, and using an older viscose (low salt test) for the particle-loaded portion. When extruded into the spin bath, the young viscose shrinks much more than old viscose, which results in the particle-loaded portion spreading and effectively encircling the plain portion to give a ring-core type of filament. Other variations could be made without departing from the basic teaching of the invention.

The present invention thus provides a method of forming a contact material by spinning streams of a spinning liquid containing a filament-forming material under such conditions that the streams are brought together as they are extruded and thereby become integrally joined along their entire lengths. At least one of the streams of spinning liquid contains a substantial amount of a contact agent, this amount being a quantity which is sufficient to maintain the activity of the contact agent, i.e., the activity of the contact material prepared in accordance with this invention based upon a unit weight of contained contact agent is approximately or about equivalent to the same quantity of free contact agent. As is brought out hereinbefore, the minimum amount of contact agent necessary to maintain the activity of the contained contact agent is dependent upon the specific nature of the contact agent, the spinning solution and the processing of the extruded spinning liquid prior to completion of the pellicle. For those contact agents which are inert, i.e., they do not swell or react when incorporated in the spinning liquid or during the possible processing of the extruded spinning liquid, the contact agent must be present in an amount of at least about 75% (preferably 80% to 90%) by weight based upon the dry pellicle. This is equivalent to at least about 300% (preferably 400% to 900%) by weight based upon the filament-forming material in the pellicle.

For those contact agents which are not completely inert in the spinning liquid or to processing liquids, for example, ion-exchange resins which swell in aqueous media, they must be used in quantities sufficient to provide a dried or finished pellicle containing at least about 40% to 85% (preferably 45% to 75%) by weight based upon the weight of the pellicle. This is equivalent to about 67% (preferably 82.5% to 300%) by weight based upon the film-forming material in the pellicle.

In forming pellicles in accordance with the present invention, it is preferred that the extrusion rate of the streams of spinning liquids is regulated to provide approximately equal amounts of the fiber-forming material in the contact agent-containing portion of the pellicle and in the portion of the pellicle which is substantially free of contact agent. Upon this basis, the spinning liquid containing the contact agent such as carbon, for example, contains at least about 600% (preferably 800% to 1800%) by weight based upon the fiber-forming material content of this stream of spinning liquid. In the case of the ion-exchange resins, they are present in the spinning liquid in an amount of at least about 133% (preferably 165% to 600%) by weight based upon the fiber-forming material. It has been found that, in general, by providing approximately equal amounts of the fiber-forming material in the two spinning liquids, there is sufficient fiber-forming material in that liquid containing the contact agent to completely bind or bond the contact agent and avoid dusting of the product and yet there is sufficient fiber-forming material free of contact agent to provide the necessary strength and physical properties. When the pellicles, particularly fibers or filaments formed in accordance with this invention are packed or assembled into a fibrous bed, fluid flows through the bed freely and an appreciably lower pressure drop will result than when the same quantity of contact agent is packed in the form of a bed or column of small granules. The fibrous material avoids dusting of the contact agent and also avoids channeling of the fluid through the bed of contact material yet it permits a thorough contact between the contact agent and the fluid passing through the fibrous bed.

I claim:

1. A contact material comprising a plurality of components of filament-forming material integrally joined together along their entire lengths to form a pellicle, at least one component containing a substantial amount of a finely-divided contact agent distributed uniformly within and forming an integral part of said component, said one component being exposed along its entire length and at least one other component being substantially free of contact agent, said substantial amount of contact agent being a quantity sufficient to maintain the activity thereof approximately equivalent to that of the free contact agent.

2. A contact material as defined in claim 1 wherein two components of filament-forming material are integrally joined together in side-by-side relationship to form a filament.

3. A contact material as defined in claim 1 wherein the contact agent-free component is in the form of a filament and the contact agent-containing component envelops annularly the contact agent-free component.

4. A contact material as defined in claim 1 wherein the filament-forming material is regenerated cellulose, the contact agent is activated carbon, the contact agent-containing component contains at least 600% activated carbon by weight based on the regenerated cellulose content of the said component and the contact material contains at least about 75% activated carbon by weight based upon the weight of the contact material.

5. A contact material as defined in claim 1 wherein the filament-forming material is regenerated cellulose, the contact agent is an ion-exchange resin, the contact agent-containing component contains at least 133% ion-exchange resin by weight based on the regenerated cellulose content of the said component and the contact material contains at least about 40% ion-exchange resin by weight based upon the weight of the contact material.

6. A filament of a spinnable organic material containing activated carbon particles, comprising a base of spinnable organic fiber material, said base being substantially free of carbon particles, a mass of activated carbon particles bonded to said base, and said carbon particles being bonded together by an additional amount of said spinnable organic fiber material, said activated carbon particles comprising at least 50% by weight of said filament.

7. A filament according to claim 6 wherein the organic fiber material is regenerated cellulose.

8. A filament according to claim 7 wherein the filament is a Siamese conjugate filament.

9. A filament of a spinnable organic material containing activated carbon particles, comprising a base of spinnable organic fiber material, said base being substantially free of carbon particles, a mass of activated carbon particles bonded to said base, and said carbon particles being bonded together by an additional amount of said spinnable organic fiber material, said activated carbon particles comprising 80 to 95% by weight of said filament.

10. A fluid filter for removing impurities from a fluid which comprises a contact material in filamentary form, each of the filaments comprising a plurality of components of organic filament-forming material integrally joined together along their entire lengths to form a pellicle, at least one component containing a substantial amount of a finely-divided contact agent distributed uniformly within and forming an integral part of said component, said one component being exposed along its entire length and at least one other component being substantially free of contact agent, said substantial amount of contact agent being a quantity sufficient to maintain the activity thereof approximately equivalent to that of the free contact agent, the filaments being arranged to form a bed of filaments.

11. A fluid filter as defined in claim 10 wherein the contact agent in the filaments is activated carbon and the contact material contains at least about 75% activated carbon by weight based upon the weight of the contact material.

12. A fluid filter as defined in claim 10 wherein the filaments are formed of regenerated cellulose.

13. A fluid filter as defined in claim 10 wherein the contact agent is an ion-exchange resin and the contact material contains at least about 40% ion-exchange resin based upon the weight of the contact material.

14. A gas filter for removing impurities from the gas, which filter comprises organic filaments, each of said filaments being made of a spinnable organic material containing activated carbon particles and comprising a base of spinnable organic fiber material, said base being substantially free of carbon particles, and a mass of activated carbon particles bonded to said base, and said carbon particles being bonded together by an additional amount of said organic spinnable fiber material, said activated carbon particles comprising at least 50% by weight of said filament, said filaments being arranged to form a bed of filaments.

15. A fluid filter as defined in claim 14 wherein the components of the filaments are integrally joined together in side-by-side relationship.

16. A fluid filter as defined in claim 14 wherein the carbon-free component of the filament is in the form of a filament and the carbon-containing component envelopes annularly the carbon-free component.

17. A bed of filaments, each of said filaments being made of a spinnable organic material containing activated carbon particles and comprising a base of spinnable organic fiber material, said base being substantially free of carbon particles, and a mass of activated carbon particles bonded to said base, and said carbon particles being bonded together by an additional amount of said organic spinnable fiber material, said activated carbon particles comprising 80 to 95% by weight of said filament.

18. A process of contacting a fluid with a contact agent, said contact agent being distributed in a fibrous bed of contact material through which the fluid is passed, the contact material being in the form of filaments having at least two components integrally joined along their entire lengths, at least one component containing a substantial amount of a finely-divided contact agent distributed uniformly within and forming an integral part of said component, said one component being exposed along its entire length and at least one other component being substantially free of contact agent, said substantial amount of contact agent being a quantity sufficient to maintain the activity thereof approximately equivalent to that of the free contact agent.

19. A method of purifying a fluid comprising bringing the fluid into contact with a fibrous bed of organic filaments, each of said filaments being made of a spinnable organic material containing activated carbon particles and comprising a base of spinnable organic fiber material, said base being substantially free of carbon particles, and a mass of activated carbon particles bonded to said base, and said carbon particles being bonded together by an additional amount of said spinnable organic fiber material, said activated carbon particles comprising at least 50% by weight of said filament.

20. A method according to claim 19 wherein the organic filaments are regenerated cellulose filaments.

21. A method according to claim 20 wherein the fluid is air.

22. A method according to claim 19 wherein the activated carbon particles comprise 80 to 95% by weight of said filaments.

23. A method according to claim 22 wherein the filaments are regenerated cellulose filaments.

24. A method according to claim 23 wherein the fluid is air.

25. A method according to claim 19 wherein said filaments are Siamese conjugate filaments.

26. A method according to claim 25 wherein the activated carbon particles comprise 80 to 95% by weight of said filaments.

27. A method according to claim 19 wherein said filaments are ring core filaments.

References Cited by the Examiner
UNITED STATES PATENTS

| 2,440,761 | 5/48 | Sisson | 18—8 |
| 2,612,679 | 10/52 | Ladisch | 28—82 |
| 2,650,168 | 8/53 | Dijk | 18—54 |
| 2,732,279 | 1/56 | Tachikawa | 18—54 |
| 2,736,920 | 3/56 | Wicker | 18—8 |
| 2,742,667 | 4/56 | Clouzeau | 18—8 |
| 2,775,505 | 12/56 | Pedlow | 18—54 |
| 2,923,378 | 2/60 | Braunlich | 55—70 |
| 3,015,367 | 1/62 | Smith et al. | 55—524 |
| 3,082,481 | 3/63 | Hinde et al. | 55—316 |

FOREIGN PATENTS 284,067  11/52  Switzerland.

REUBEN FRIEDMAN, *Primary Examiner.*

HERBERT L. MARTIN, WALTER BERLOWITZ, WILLIAM S. COLE, *Examiners.*